Patented Jan. 23, 1923.

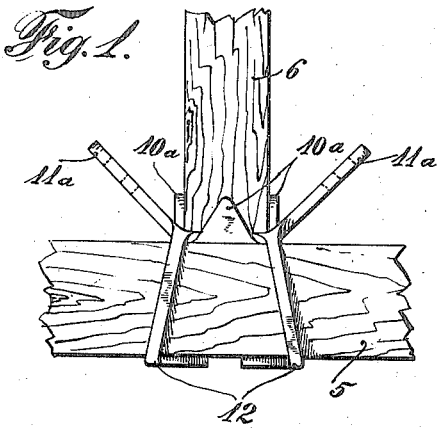
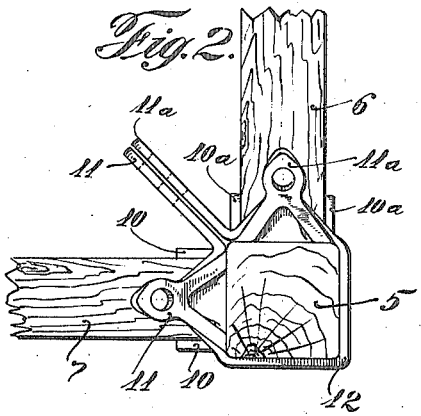
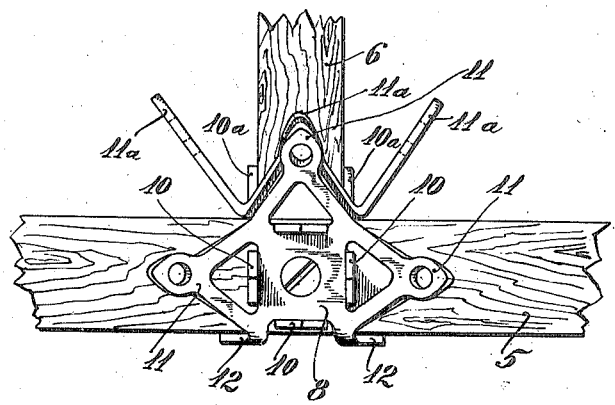
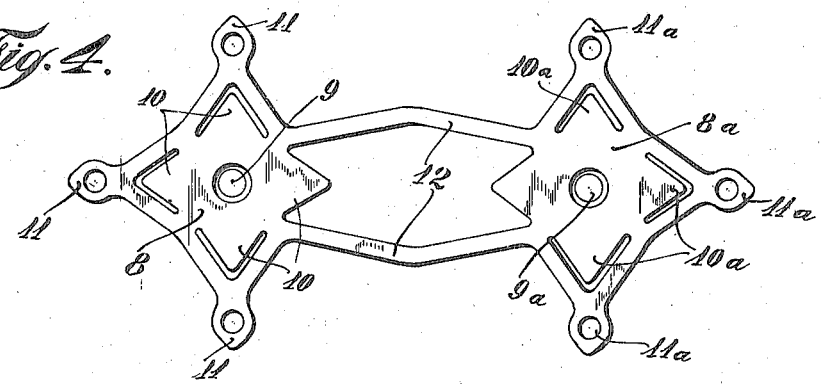

1,443,155

UNITED STATES PATENT OFFICE.

WILLIAM T. THOMAS, OF ITHACA, NEW YORK, ASSIGNOR OF ONE-TENTH TO THOMAS-MORSE AIRCRAFT CORPORATION, OF ITHACA, NEW YORK, A CORPORATION OF NEW YORK.

CLIP FOR AIRPLANE CONSTRUCTION.

Application filed July 9, 1920. Serial No. 394,895.

*To all whom it may concern:*

Be it known that I, WILLIAM T. THOMAS, a citizen of the Argentine Republic, residing at Ithaca, in the county of Tompkins and State of New York, have invented a certain new and useful Improvement in Clips for Airplane Construction, of which improvement the following is a specification.

This invention relates to airplane construction and has for its object to provide an improved metal clip for fastening together the members of the frame of the fuselage or body of the airplane, which construction shall possess the necessary strength, be as light as possible in weight, and adapted to be easily manufactured at a low cost. According to my improvement, the clip is formed of one integral piece of metal adapted to be stamped or punched out of blank plate stock, and then bent to the desired shape around the longitudinal frame member, the lugs being bent up at right angles to the base to form sockets for securely holding the ends of the struts and other lugs for connections for the diagonal bracing.

In the accompanying drawing: Figure 1 is a side elevation of a fuselage joint in which the frame members are connected by a metal clip embodying my improvement; Fig. 2, an end elevation; Fig. 3, an elevation opposite to Fig. 1; and Fig. 4, a plan of my improved clip as stamped or punched out of a sheet metal strip and before bending the parts to the position assumed when in use.

According to my improvement, the clip is formed with one or more base portions, two of these, 8 and $8^a$, being shown in the drawings, and each base portion is provided with lugs, 10 and $10^a$, respectively, projecting at substantially right angles to the bases for forming sockets to receive and hold the ends of the lateral strut members, such as 6 and 7, each base portion being adapted to seat against one side or face of the longitudinal frame member, 5. The base portions are also provided with screw holes, such as 9 and $9^a$, for inserting screws to rigidly secure the clip to the longitudinal frame member and prevent any slipping thereon. There are also provided at the outside of the lugs, 10 and $10^a$, longer lugs or ears, 11 and $11^a$, extending at an angle to the plane of the bases and for use in attaching the diagonals or tension members of the truss bracing.

The clip is also formed with a portion, 12, which may be in the shape of two or more bands or strips, connecting the base portions, and extending around the other sides of the longitudinal frame member for securing the same in position.

While my improved clip may be manufactured in various ways, I prefer to make the same by the process of punching or stamping the blanks from a plane sheet or strip of metal of the desired thickness and flexibility, as shown particularly in Fig. 4, the lugs, 10, $10^a$, etc., being formed by punching slots of the desired shape around the outside of the base portion or portions, such as 8 and $8^a$, and then bending the lugs up at substantially right angles to the base to form the sockets for the ends of the lateral struts. The ears, 11 and $11^a$, may then be bent up at the desired angle of inclination for connection with the diagonal truss wires, and the clip be bent at suitable right angle turns to fit around the frame member, 5, with the base portions seated upon the desired side faces thereof.

According to the form of clip shown in the drawings, the two base portions are located at opposite ends of the blank and adapted to seat upon adjacent side faces of the frame member when the clip is bent around the same with the opposite end ears, 11 and $11^a$, meeting together and forming the attachment for one of the diagonal wires, as indicated in Figs. 2 and 3, the ears being provided with holes at their ends which may be punched therein for this purpose.

The construction thus formed comprises an integral or one-piece clip for joining two lateral struts or compression members with a longitudinal frame member, and also for attaching the diagonal bracing wires. It is desirable that the centre line of the ears for the bracing wires should be substantially in the same plane with the centre line of the corresponding strut retaining lugs and the centre of the strut seat, and this is accomplished according to my improvement by turning up the retaining lugs out of the lifting ears at the outside of the base or strut seat. This feature also has the advantage of leaving the full metal base for the strut seat inside of the lugs, which may be utilized for carrying the anchorage screws or bolts for securely fastening the clip to the frame member. This is found to be of considerable importance in actual practice, since considerable difficulty has been encountered by clips sliding along the longerons or other frame members, and it has been found necessary to secure them in position by screws or bolts.

My improved construction also lends itself to quantity production, as the clip may be entirely formed by machinery, including the bending under a punch press, thereby eliminating all hand work, riveting, welding, or brazing. The clips may, therefore, be turned out rapidly at very low cost, and being formed in one integral piece, they have the further advantage that they may be heat treated whenever necessary without danger of separating the parts, which is very difficult with a brazed clip.

Having now described my invention, what I claim as new and desire to secure by Letters Patent is:

1. A clip for airplane construction, comprising a base portion adapted to seat upon one side of a frame member, lifting ears integral with said base for attaching diagonal bracing, integral lugs turned up out of the said ears at the outside of the strut seat and forming a socket for the end of a lateral strut.

2. A clip for airplane construction, comprising a base portion adapted to seat upon one side of a frame member, lifting ears integral with said base for attaching diagonal bracing, integral lugs turned up out of the said ears at the outside of the strut seat and forming a socket for the end of a lateral strut, an integral portion extending around the other sides of the frame member, and a fastening screw extending through the base of said socket into the frame member.

3. A clip for airplane construction, comprising two base portions adapted to seat upon adjacent sides of a frame member, lifting ears integral with said bases for attaching diagonal bracing, integral lugs turned up out of said ears and forming sockets for the ends of lateral struts, and an integral portion extending around the other sides of the frame member.

4. A clip for airplane construction, comprising two base portions adapted to seat upon adjacent sides of a frame member, and each having projecting lugs to form sockets for the ends of lateral struts, an integral portion connecting said bases and extending around the other sides of the frame member, and ears also formed integral with the base and extending at an angle thereto for attaching diagonal bracing, the centre line of said ears being in substantially the same plane with the centre line of the corresponding strut retaining lugs and the centre of the strut seat.

5. A clip for airplane construction, comprising two base portions adapted to seat upon adjacent sides of the frame member, and each having projecting lugs to form sockets for the ends of lateral struts, an integral portion connecting said bases and extending around the other sides of the frame member, and ears also formed integral with the base and extending at an angle thereto for attaching diagonal bracing, the centre line of said ears being in substantially the same plane with the centre line of the corresponding strut retaining lugs and the centre of the strut seat, and the two opposite end ears meeting together to form an attachment for one of the diagonals.

In testimony whereof I have hereunto set my hand.

WILLIAM T. THOMAS.